(12) United States Patent
Kenemer et al.

(10) Patent No.: US 11,394,732 B1
(45) Date of Patent: Jul. 19, 2022

(54) SYSTEMS AND METHODS FOR ADAPTIVELY MANAGING DATA DRIFT IN A CLASSIFIER

(71) Applicant: Symantec Corporation, Mountain View, CA (US)

(72) Inventors: Keith Kenemer, Mountain View, CA (US); Javier Echauz, Alpharetta, GA (US); Sarfaraz Hussein, Mountain View, CA (US)

(73) Assignee: NortonLifeLock Inc., Tempe, AZ (US)

( * ) Notice: Subject to any disclaimer, the term of this patent is extended or adjusted under 35 U.S.C. 154(b) by 451 days.

(21) Appl. No.: 16/566,754

(22) Filed: Sep. 10, 2019

(51) Int. Cl.
*H04L 9/40* (2022.01)
*G06N 20/00* (2019.01)

(52) U.S. Cl.
CPC ......... *H04L 63/1425* (2013.01); *G06N 20/00* (2019.01); *H04L 63/1416* (2013.01)

(58) Field of Classification Search
CPC .. H04L 63/1425; H04L 63/1416; G06N 20/00
USPC .......................................................... 726/23
See application file for complete search history.

(56) References Cited

U.S. PATENT DOCUMENTS

| | | | | |
|---|---|---|---|---|
| 9,135,559 | B1 * | 9/2015 | Chan | G06N 5/022 |
| 10,192,172 | B2 * | 1/2019 | Chan | G06N 20/00 |
| 2017/0330109 | A1 * | 11/2017 | Maughan | G06N 20/00 |
| 2018/0018587 | A1 * | 1/2018 | Kobayashi | G06N 5/04 |
| 2019/0080019 | A1 * | 3/2019 | Young | G06N 5/02 |
| 2020/0019699 | A1 * | 1/2020 | Araujo | G06N 3/08 |
| 2020/0218982 | A1 * | 7/2020 | Annau | G06N 20/00 |
| 2020/0242000 | A1 * | 7/2020 | Khosrowpour | G06F 11/3608 |
| 2020/0264965 | A1 * | 8/2020 | Harutyunyan | G06N 20/00 |
| 2020/0311878 | A1 * | 10/2020 | Matsuura | G06V 10/30 |
| 2020/0342252 | A1 * | 10/2020 | Givental | G08B 29/186 |
| 2020/0380362 | A1 * | 12/2020 | Cao | G06N 3/08 |

(Continued)

OTHER PUBLICATIONS

Ng, Andrew, "Sparse Autoencoder", URL: https://web.stanford.edu/class/cs294a/sparseAutoencoder_2011new.pdf, CS294A Lecture Notes, 2011, pp. 1-19.

(Continued)

*Primary Examiner* — Badri Narayanan Champakesan
(74) *Attorney, Agent, or Firm* — FisherBroyles, LLP

(57) ABSTRACT

The disclosed computer-implemented method for adaptively managing data drift in a classifier may include (i) receiving, at a computing device, an input sample of digital information having an unknown reputation and (ii) performing a security action that may include (A) identifying the input sample as benign or malicious based on a result obtained by classifying the input sample using a machine learning model trained using activity regularization, (B) calculating an internal activity of the machine learning model occurring during the classifying, (C) calculating an activation entropy of the machine learning model occurring during the classifying, (D) comparing a combination of the internal activity and the activation entropy to a threshold, and (E) when the combination of the internal activity and the activation entropy meets or exceeds the threshold, identifying the result as a low-confidence result. Various other methods, systems, and computer-readable media are also disclosed.

18 Claims, 9 Drawing Sheets

(56) References Cited

U.S. PATENT DOCUMENTS

2020/0401696 A1* 12/2020 Ringlein ................ G06N 20/00

OTHER PUBLICATIONS

Sethi et al., "On the Reliable Detection of Concept Drift from Streaming Unlabeled Data", URL: https://arxiv.org/pdf/1704.00023.pdf, Apr. 4, 2017, pp. 1-29.
Saurav et al., "Online Anomaly Detection with Concept Drift Adaptation Using Recurrent Neural Networks", 18 Proceeding of the ACM India Joint International Conference on Data Science and Management of Data, Jan. 11-13, 2018, 10 pages.
Brownlee, Jason, "A Gentle Introduction to Activation Regularization in Deep Learning", URL: https://machinelearningmastery.com/activation-regularization-for-reducing-generalization-error-in-deep-learning-neural-networks/, Nov. 28, 2018, pp. 1-12.
Changhau, Isaac, "Loss Functions in Neural Networks", URL: https://www.scribd.com/document/397830563/Loss-Functions-in-Neural-Networks-pdf, Jun. 7, 2017, pp. 1-6.

* cited by examiner

SYSTEMS AND METHODS FOR ADAPTIVELY MANAGING DATA DRIFT IN A CLASSIFIER

BACKGROUND

Performance of machine learning models such as classifiers may degrade when there are mismatches between training data distributions and new input data. This may occur due to data drift with time and/or variation across endpoints. The present disclosure, therefore, identifies and addresses a need for systems and methods for adaptively managing data drift in a classifier.

SUMMARY

As will be described in greater detail below, the present disclosure describes various systems and methods for adaptively managing data drift in a classifier.

In one example, a computer-implemented method for adaptively managing data drift in a classifier may include (i) receiving, at a computing device, an input sample of digital information having an unknown reputation and (ii) performing, at the computing device, a security action. The security action may include (A) identifying the input sample as either benign or malicious based on a result obtained by classifying the input sample using a machine learning model trained using activity regularization, (B) calculating an internal activity of the machine learning model occurring during the classifying of the input sample, (C) calculating an activation entropy of the machine learning model occurring during the classifying of the input sample, (D) comparing a combination of the internal activity and the activation entropy to a first threshold, and (E) when the combination of the internal activity and the activation entropy meets or exceeds the first threshold, identifying the result as a low-confidence result.

In some examples, the method may further include training the machine learning model using activity regularization.

In an example, the method may further include sending, from the computing device and responsive to identifying the result as a low-confidence result, a notification to a back-end server requesting a machine learning model update. In an embodiment, the machine learning model update may reduce overfitting.

In an example, the method may further include (i) storing the low-confidence result in an event queue and (ii) sending, when a number of low-confidence results in the event queue meets or exceeds a second threshold and to a back-end server, a notification indicating data drift. In an embodiment, the method may further include receiving, responsive to the notification and from the back-end server, an instruction to set a monitoring mode. In an example, the method may further include receiving, responsive to the notification and from the back-end server, a machine learning model update.

In an embodiment, the method may further include sending, to a back-end server, a notification identifying the result as the low-confidence result. In an example, the method may further include receiving, responsive to the notification identifying the result as the low-confidence result and from a back-end server, a result override. In some embodiments, the method may further include receiving, responsive to the notification identifying the result as the low-confidence result and from a back-end server, an acknowledgement that the result is a low-confidence result.

In some examples, the method may further include (i) sending, responsive to identifying the result as the low-confidence result, the input sample to a back-end server and (ii) receiving a machine learning model update customized for the computing device, where the machine learning model update is based at least in part on the input sample.

In an embodiment, the machine learning model may include a random forest classifier. In some examples, the machine learning model may include a neural forest classifier. In an example, the machine learning model may include a neural network configured as a classifier.

In some embodiments, the method may further include displaying, on a user display, an indication the result is a low-confidence result.

In one embodiment, a system for adaptively managing data drift in a classifier may include a computing device including at least one physical processor and physical memory that includes computer-executable instructions that, when executed by the physical processor, cause the physical processor to (i) receive, at the computing device, an input sample of digital information having an unknown reputation and (ii) perform, at the computing device, a security action. The security action may include (A) identifying the input sample as either benign or malicious based on a result obtained by classifying the input sample using a machine learning model trained using activity regularization, (B) calculating an internal activity of the machine learning model occurring during the classifying of the input sample, (C) calculating an activation entropy of the machine learning model occurring during the classifying of the input sample, (D) comparing a combination of the internal activity and the activation entropy to a first threshold, and (E) when the combination of the internal activity and the activation entropy meets or exceeds the first threshold, identifying the result as a low-confidence result.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) receive, at the computing device, an input sample of digital information having an unknown reputation and (ii) perform, at the computing device, a security action. The security action may include (A) identifying the input sample as either benign or malicious based on a result obtained by classifying the input sample using a machine learning model trained using activity regularization, (B) calculating an internal activity of the machine learning model occurring during the classifying of the input sample, (C) calculating an activation entropy of the machine learning model occurring during the classifying of the input sample, (D) comparing a combination of the internal activity and the activation entropy to a first threshold, and (E) when the combination of the internal activity and the activation entropy meets or exceeds the first threshold, identifying the result as a low-confidence result.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification.

Together with the following description, these drawings demonstrate and explain various principles of the present disclosure.

Figure 1:
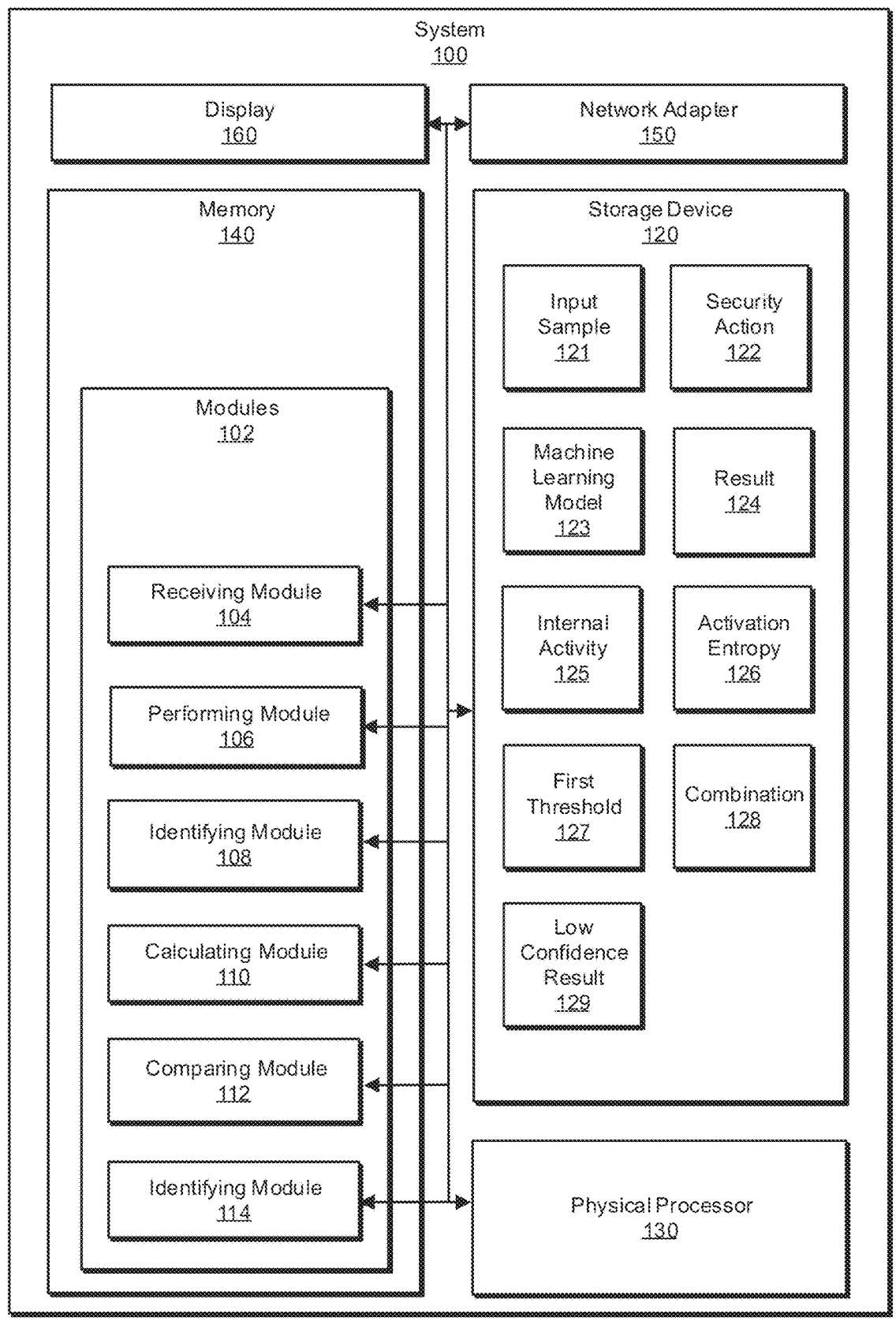
FIG. 1 is a block diagram of an example system for adaptively managing data drift in a classifier.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the present disclosure covers all modifications, equivalents, and alternatives falling within the scope of the appended claims.

DETAILED DESCRIPTION OF EXAMPLE EMBODIMENTS

The present disclosure is generally directed to systems and methods for adaptively managing data drift in a classifier. In some examples, provided are techniques that may identify data drift and may mitigate data drift. The provided systems and methods may use activity regularization for neural networks in manners that improve generalizability of neural network models by encouraging sparse internal activations in the classifiers. Neural networks trained using activity regularization may have an ability to provide introspective information describing degrees of sparsity of activations of respective neurons (e.g., a level of confidence in the output of the neural networks) in response to specific input data.

In some examples, the provided techniques may train machine learning models (e.g., neural network models) using activity regularization techniques. During deployment, for input sample predictions, the provided techniques may compute respective internal activity of the machine learning models during classifying of the input samples and respective activation entropy of the machine learning models during classifying of the input samples. The provided techniques may monitor activity-related variables. When thresholds (e.g., trigger thresholds, detection thresholds) are exceeded, computing devices may notify back-end computing devices. Potential notifications to a backend computing device may include: low-confidence prediction, possible data drift detected, model update requested, etc. The back-end computing devices may respond to requests from the computing devices. Possible responses may include: model update, prediction override, set monitor mode, etc. Low-confidence samples from specific computing devices may be used to re-weight samples to create new machine learning training models customized for specific computing devices.

Neural networks trained using activity regularization may advantageously provide self-monitoring capabilities. These techniques may advantageously enable computing devices to be more self-aware and thus interact with back-end computing devices in a more intelligent manner to assist with decisions specific to each computing device. In some examples, specific decisions may advantageously include performing machine learning training model updates on-demand and/or providing machine learning training model updates that are customized for specific computing devices. In some examples, neural networks in the provided systems may advantageously be robust to change.

By doing so, the systems and methods described herein may advantageously improve the security of computing devices and/or provide targeted protection against malware and/or malicious users. As such, the provided techniques may protect users by beneficially reducing security risks posed by malicious processes and/or malicious users. In some embodiments, the provided techniques may advantageously improve accuracy of classifiers. In examples, the provided techniques may advantageously mitigate data drift with time and/or variation across computing devices and thus may enhance performance of classifiers. In some embodiments, the provided techniques may advantageously be implemented with low overhead.

Figure 2:
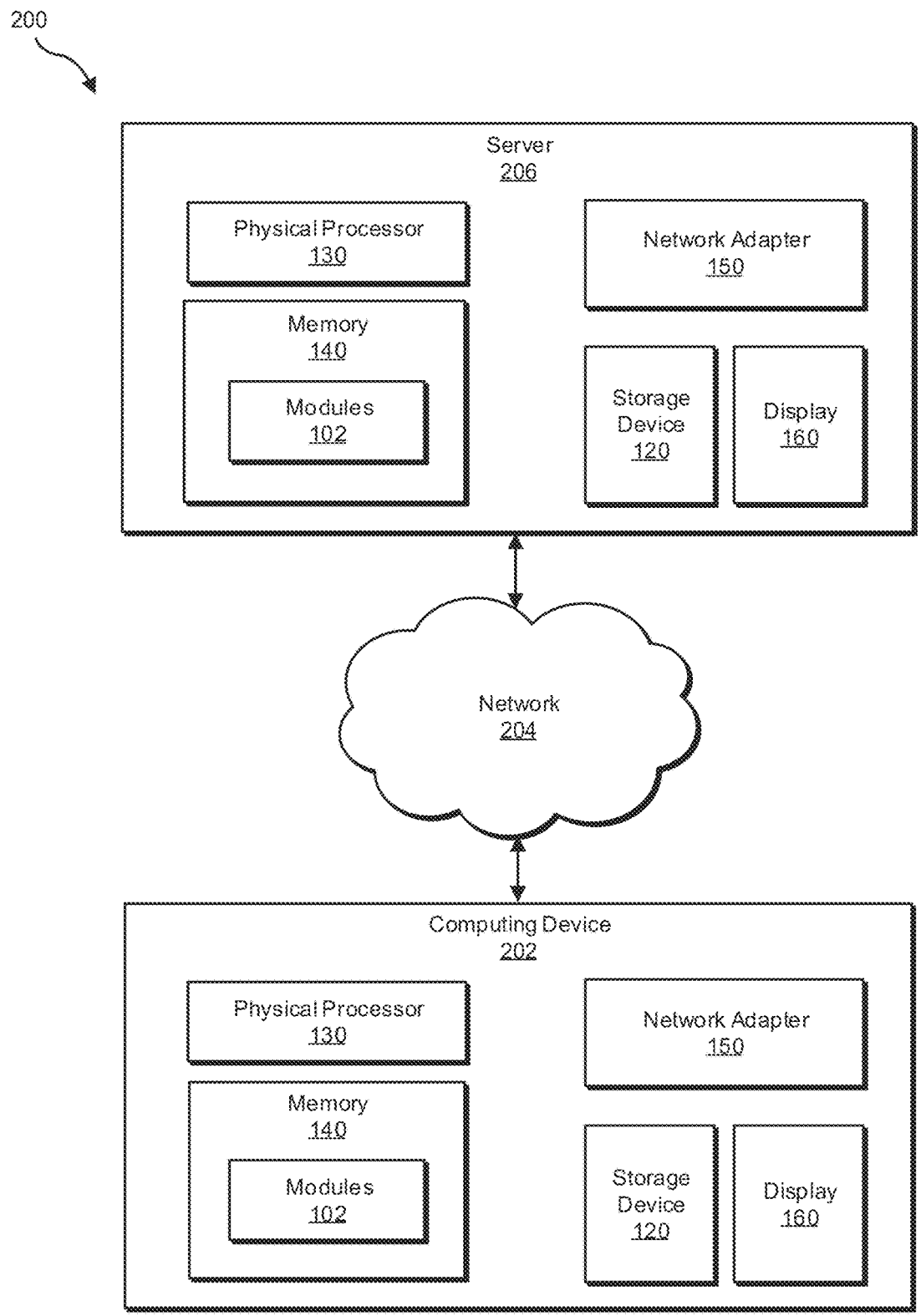
FIG. 2 is a block diagram of an additional example system for adaptively managing data drift in a classifier.
Figure 6:
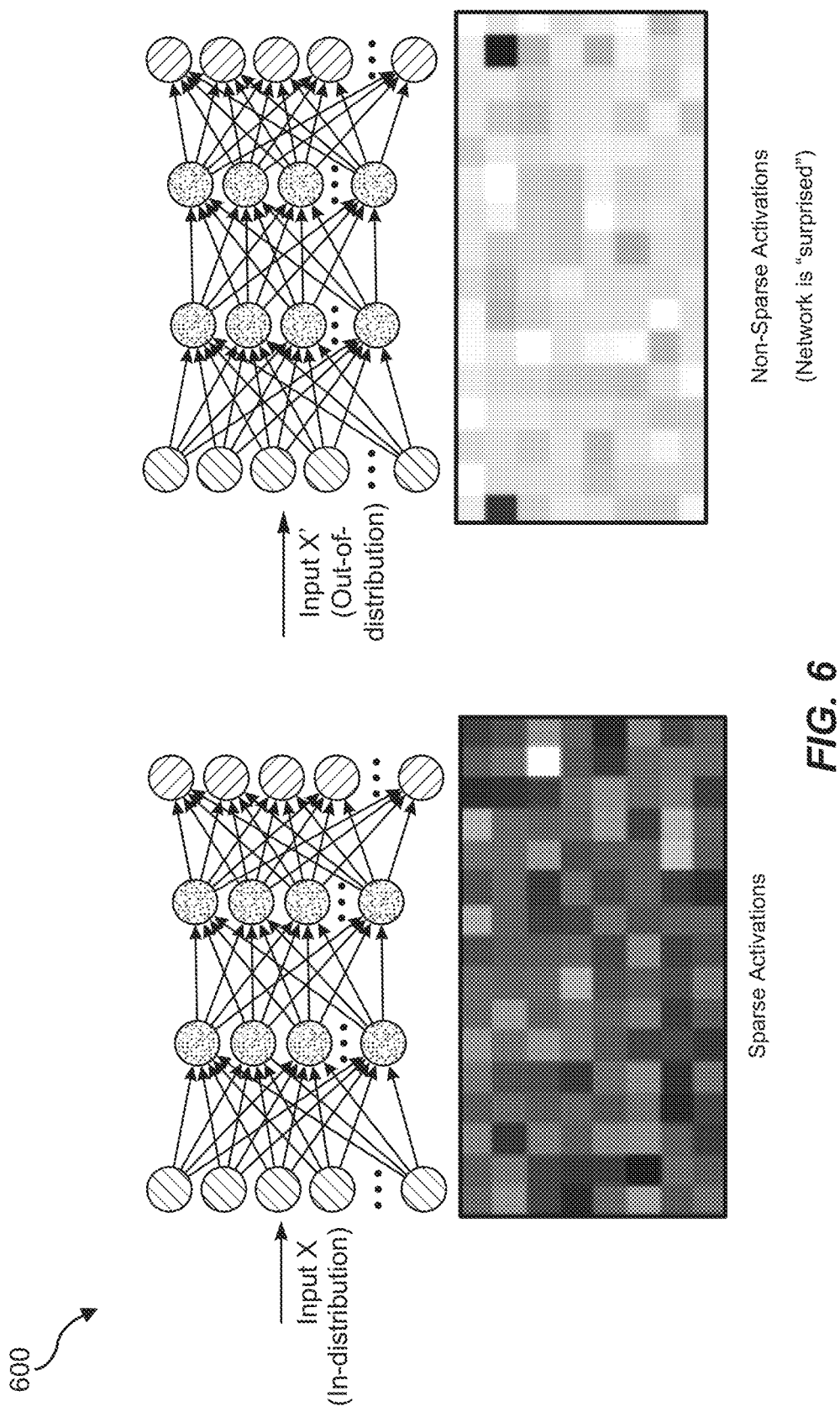
FIG. 6 is a diagram of example neural network activations present when input data is within training data distribution and example neural network activations present when input data is outside of the training data distribution.
Figure 7:
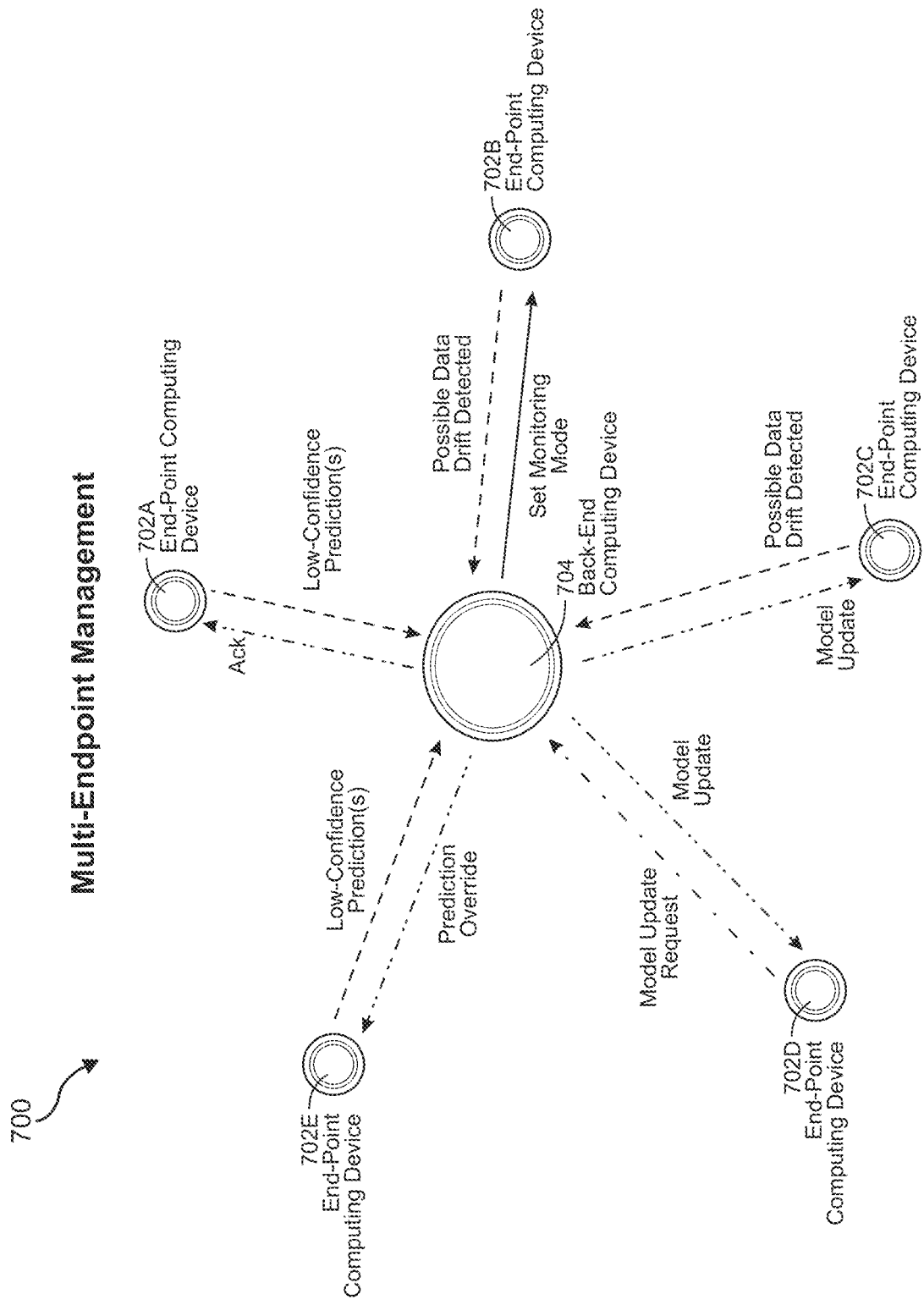
FIG. 7 is a diagram of example management of multiple computing devices by a back-end computing device.

The following will provide, with reference to FIGS. 1-2 and 7, detailed descriptions of example systems for adaptively managing data drift in a classifier. Detailed descriptions of corresponding computer-implemented methods will also be provided in connection with FIGS. 3-6. In addition, detailed descriptions of an example computing system and network architecture capable of implementing one or more of the embodiments described herein will be provided in connection with FIGS. 8 and 9, respectively.

FIG. 1 is a block diagram of an example system 100 for adaptively managing data drift in a classifier. As illustrated in this figure, example system 100 may include one or more modules 102 for performing one or more tasks. As will be explained in greater detail below, modules 102 may include a receiving module 104, a performing module 106, an identifying module 108, a calculating module 110, a comparing module 112, and/or an identifying module 114. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202 and/or server 206). One or more of modules 102 in FIG. 1 may also represent all or portions of one or more special-purpose computers configured to perform one or more tasks.

As illustrated in FIG. 1, example system 100 may also include one or more tangible storage devices, such as storage device 120. Storage device 120 generally represents any type or form of volatile or non-volatile storage device or medium capable of storing data and/or computer-readable instructions. In one example, storage device 120 may store, load, and/or maintain information indicating one or more of an input sample 121, a security action 122, a machine learning model 123, a result 124, an internal activity 125, an activation entropy 126, a first threshold 127, a combination 128, and/or a low-confidence result 129. In some examples, storage device 120 may generally represent multiple storage devices. Examples of storage device 120 include, without limitation, Random Access Memory (RAM), Read Only Memory (ROM), flash memory, Hard Disk Drives (HDDs), Solid-State Drives (SSDs), optical disk drives, caches, a cloud-based storage device, variations or combinations of one or more of the same, and/or any other suitable storage memory.

As illustrated in FIG. 1, example system 100 may also include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate adaptively managing data drift in a classifier. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 may also include one or more network adapters, such as network adapter 150. In some examples, network adapter 150 may be a physical network adapter connected to a physical network (e.g., network 204 in FIG. 2).

As illustrated in FIG. 1, example system 100 may also include one or more display devices, such as display 160. Display 160 generally represents any type or form of device capable of visually displaying information (e.g., to a user). In some examples, display 160 may present a graphical user interface. In non-limiting examples, display 160 may present at least a portion of information indicating one or more of input sample 121, security action 122, machine learning model 123, result 124, internal activity 125, activation entropy 126, first threshold 127, combination 128, and/or low-confidence result 129.

Example system 100 in FIG. 1 may be implemented in a variety of ways. For example, all or a portion of example system 100 may represent portions of example system 200 in FIG. 2. As shown in FIG. 2, system 200 may include a computing device 202 (e.g., a computing device) in communication with a server 206 (e.g., a back-end computing device) via a network 204. In one example, all or a portion of the functionality of modules 102 may be performed by computing device 202, server 206, and/or any other suitable computing system. As will be described in greater detail below, one or more of modules 102 from FIG. 1 may, when executed by at least one processor of computing device 202 and/or server 206, enable computing device 202 and/or server 206 to adaptively manage data drift in a classifier. For example, and as will be described in greater detail below, one or more of modules 102 may cause computing device 202 and/or server 206 to (i) receive, at computing device 202, input sample 121 (e.g., of digital information having an unknown reputation) and (ii) perform, at computing device 202, security action 122. Security action 122 may include (A) identifying input sample 121 as either benign or malicious based on result 124 obtained by classifying input sample 121 using machine learning model 124 trained using activity regularization, (B) calculating internal activity 125 of machine learning model 123 occurring during the classifying of input sample 121, (C) calculating activation entropy 126 of machine learning model 123 occurring during the classifying of input sample 121, (D) comparing combination 128 (e.g., of internal activity 125 and activation entropy 126) to first threshold 127, and (E) when combination 128 meets or exceeds first threshold 127, identifying result 124 as low-confidence result 129.

Computing device 202 generally represents any type or form of computing device capable of reading computer-executable instructions. In some examples, computing device 202 may represent a computer running security software, such as anti-malware software. Additional examples of computing device 202 include, without limitation, end-point computing devices, laptops, tablets, desktops, servers, cellular phones, Personal Digital Assistants (PDAs), multimedia players, embedded systems, wearable devices (e.g., smart watches, smart glasses, etc.), smart vehicles, smart packaging (e.g., active or intelligent packaging), gaming consoles, so-called Internet-of-Things devices (e.g., smart appliances, etc.), variations or combinations of one or more of the same, and/or any other suitable computing device.

Network 204 generally represents any medium or architecture capable of facilitating communication or data transfer. In one example, network 204 may facilitate communication between computing device 202 and server 206. In this example, network 204 may facilitate communication or data transfer using wireless and/or wired connections. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Server 206 generally represents any type or form of computing device capable of reading computer-executable instructions. In some examples, server 206 may represent a computer running security software, such as anti-malware software. Additional examples of server 206 include, without limitation, security servers, application servers, web servers, storage servers, and/or database servers configured to run certain software applications and/or provide various security, web, storage, and/or database services. Although illustrated as a single entity in FIG. 2, server 206 may include and/or represent a plurality of servers that work and/or operate in conjunction with one another.

Figure 3:
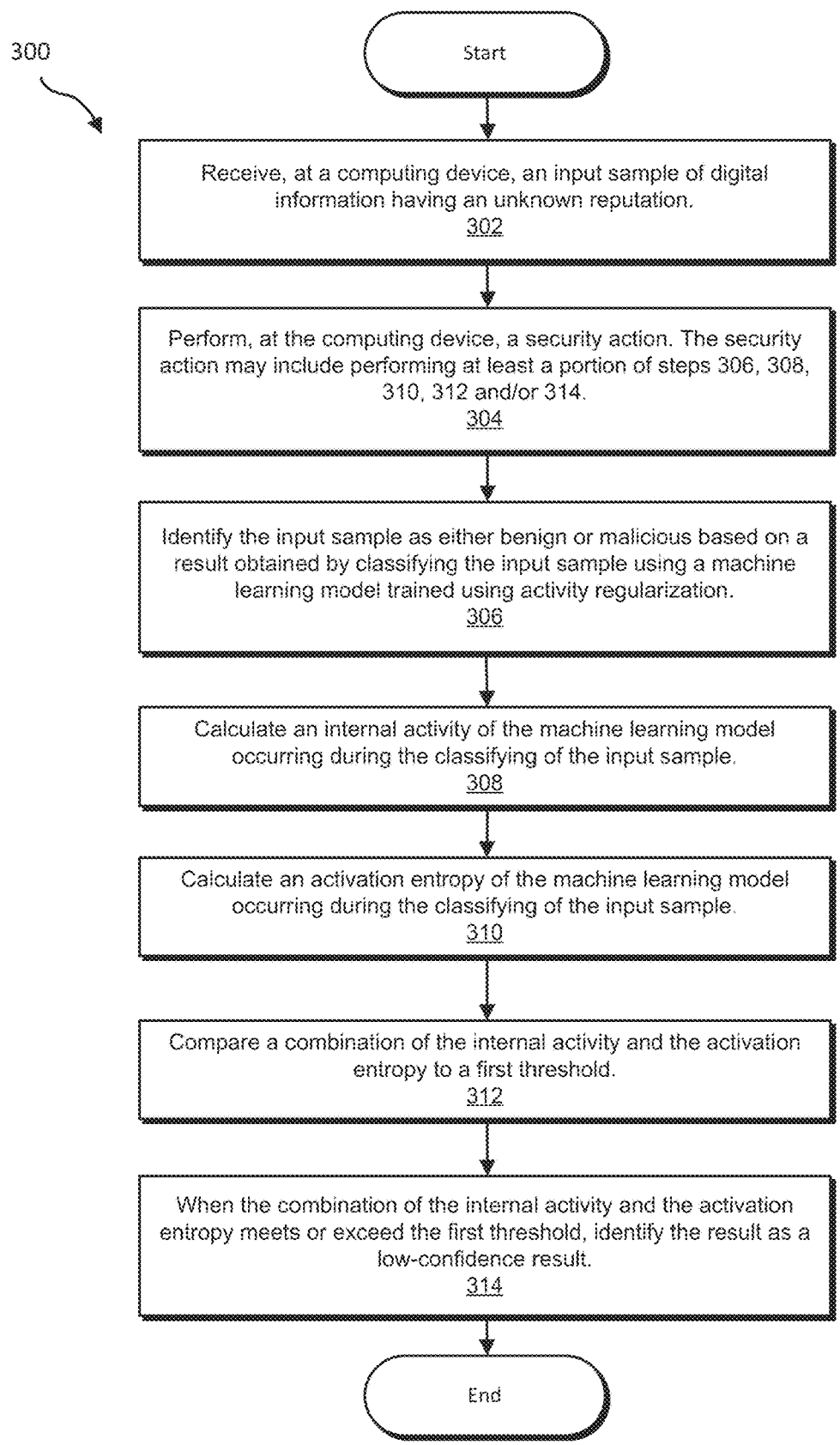
FIG. 3 is a flow diagram of an example method for adaptively managing data drift in a classifier.
Figure 4:
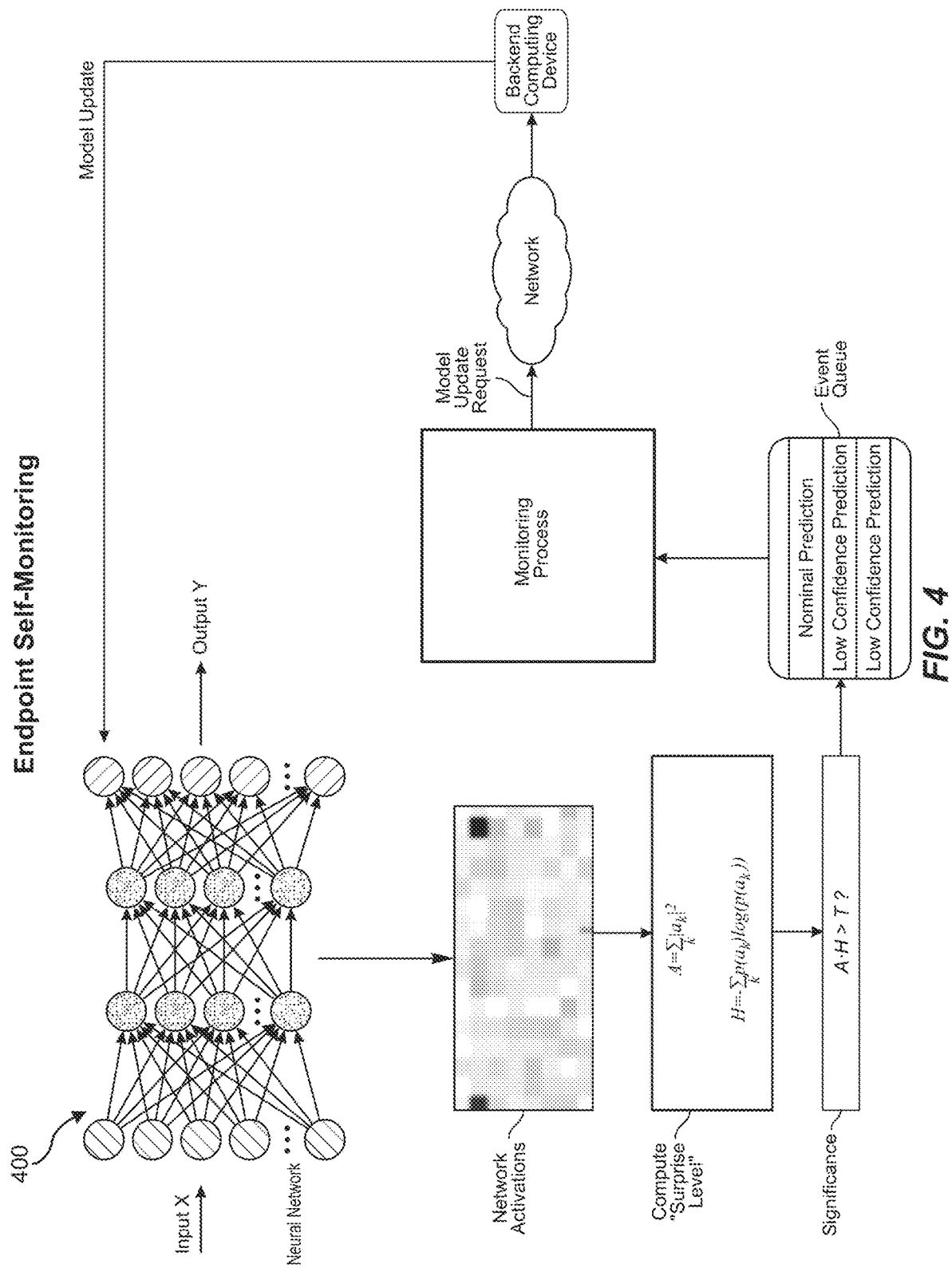
FIG. 4 is a flow diagram of an additional example method for adaptively managing data drift in a classifier.

FIG. 3 is a flow diagram of an example computer-implemented method 300 for adaptively managing data drift in a classifier. FIG. 4 is a flow diagram 400 of an example implementation of method 300. The steps shown in FIG. 3 may be performed by any suitable computer-executable code and/or computing system, including system 100 in FIG. 1, system 200 in FIG. 2, and/or variations or combinations of one or more of the same. In one example, each of the steps shown in FIG. 3 may represent an algorithm whose structure includes and/or is represented by multiple sub-steps, examples of which will be provided in greater detail below.

As illustrated in FIG. 3, at step 302 one or more of the systems described herein may receive (e.g., at a computing device), input samples of digital information having unknown reputations. The systems described herein may perform step 302 in a variety of ways. For example, receiving module 104 may, as part of computing device 202 and/or server 206 in FIG. 2, receive (e.g., at a computing device), input sample 121 (e.g., of digital information having an unknown reputation).

Referring to FIG. 4, a neural network of a computing device (e.g., computing device 202) receives "Input X," which may be an input sample of digital information having an unknown reputation. We now return to FIG. 3.

As illustrated in FIG. 3, at step 304 one or more of the systems described herein may perform (e.g., at the computing device), security actions. The security actions may include performing at least a portion of steps 306, 308, 310, 312 and/or 314. The systems described herein may perform step 304 in a variety of ways. For example, performing module 106 may, as part of computing device 202 and/or server 206 in FIG. 2, perform (e.g., at the computing device), security action 122.

As illustrated in FIG. 3, at step 306 one or more of the systems described herein may identify the input samples as either benign or malicious based on results obtained by classifying the input samples using a machine learning model trained using activity regularization. The systems described herein may perform step 306 in a variety of ways. For example, identifying module 108 may, as part of computing device 202 and/or server 206 in FIG. 2, identify input sample 121 as either benign or malicious based on result 124 obtained by classifying input sample 121 using machine learning model 123 trained using activity regularization.

In an embodiment, the machine learning model may include a random forest classifier. In some examples, the machine learning model may include a neural forest classifier. In an example, the machine learning model may include a neural network configured as a classifier. In an embodiment, the machine learning model may include a recurrent neural network (RNN).

Referring to FIG. 4, the neural network classifies "Input X," to produce "Output Y." We now return to FIG. 3.

In some examples, method 300 may further include training the machine learning model using activity regularization.

Figure 5:
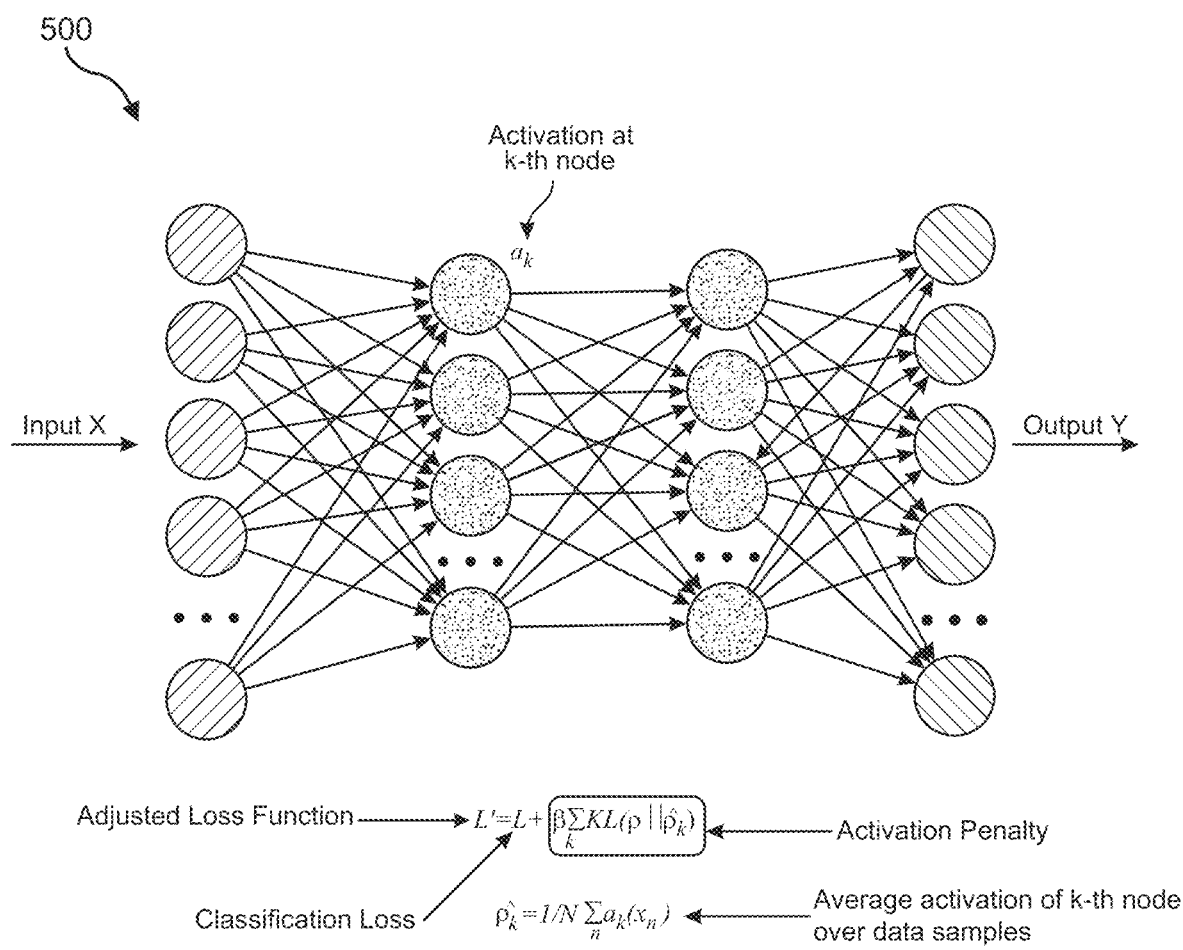
FIG. 5 is a diagram of example activity regularization.

FIG. 5 is a diagram of an example activity regularization technique 500 that may be performed when preparing activation functions in a machine learning model (e.g., a classifier model and/or a machine learning model update). Implementing activity regularization techniques when training neural networks using may prevent overfitting. Activity regularization techniques may add an activation penalty to a loss function to encourage sparse internal activations, to encourage low-entropy internal activations, and/or to improve generalizability.

In one example, an adjusted loss function (L') may identify optimization of neural network training to distinguish input data samples as malicious or benign. In some embodiments, the adjusted loss function (L') may be evaluated and/or updated over batches of input data samples with stochastic gradient descent (SGD) optimization. The adjusted loss function (L') may be calculated as:

$$L' = L + \beta \sum_k KL(\rho \| \hat{\rho}_k)$$

where:
L'=adjusted loss function
L=classification loss function (e.g., binary cross entropy, multi-class cross entropy)
β=a regularization hyperparameter for a Kullback-Leibler (KL) divergence-based activation penalty
k=a number of nodes in the neural network
ρ=desired low probability of activation at node k (e.g., a constant 0.01). Activation is typically an output of a sigmoid function at a hidden layer, so values fall between 0 and 1.
$\hat{\rho}$=empirical average activation at node k (e.g., over the training set). The KL divergence at each node is cross-entropy minus self-entropy is equal to: −rho*log(rhoHat)−(1−rho)*log(1−rhoHat)+rho*log(rho)+(1−rho)*log(1−rho). The complete penalty is the sum of KL divergence across all nodes.

and where an average activation of k-th nodes over multiple data samples may be calculated as:

$$\hat{\rho}_k = \frac{1}{N} \sum_n a_k(x_n)$$

where:
N=total number of data samples
n=index into the data samples
$a_k$=activation at k-th node
$x_n$=$n^{th}$ data sample The activation penalty (i.e., sparsity penalty) that is added to the classification loss may discourage activations. In some examples, the activation penalty may attempt to minimize a number of activations in each hidden layer (e.g., to as low of a value as is practicable and/or a value of one).

We now turn to FIG. 6.

FIG. 6 is a diagram of example neural network activations 600 that may be present when input data may be within training data distribution and example neural network activations present when input data may be outside of the training data distribution. The examples of FIG. 6 are non-limiting. FIG. 6 depicts a trained neural network into which two different data samples are input.

The data sample on the left of FIG. 6 is an "in-distribution" data sample. When processed by the trained neural network, the "in-distribution" data sample produces sparse activations of nodes (a.k.a. neurons) in the trained neural network. In FIG. 6, the grayscale matrix indicates node-specific degrees of activation of respective nodes in the trained neural network. In the example of FIG. 6, darker blocks in the matrix may represent lower degrees of activation, while lighter blocks in the matrix may represent higher degrees of activation. As can be seen by the generally darker shading, the "in-distribution" data sample of FIG. 6 produces sparse activations. In this example, most nodes have lower degrees of activation. In this example, only one node has a very high level of activation.

In contrast, the data sample on the right of FIG. 6 is an "out-of-distribution" data sample. When processed by the trained neural network, the "out-of-distribution" data sample produces non-sparse activations of nodes in the trained neural network. As can be seen by the generally lighter shading, the "out-of-distribution" data sample of FIG. 6 produces non-sparse activations. In this example, most nodes have higher degrees of activation. In this example, only two nodes have a very low levels of activation.

An "out-of-distribution" condition may occur when there are mismatches between training data distributions and new input data (i.e., data drift). The "out-of-distribution" condition may occur due to data drift with time and/or variation across endpoints. The "out-of-distribution" condition may degrade performance of classifiers. We now return to FIG. 3.

As illustrated in FIG. 3, at step 308 one or more of the systems described herein may calculate internal activities of the machine learning models during the classifying of the input samples. The systems described herein may perform step 308 in a variety of ways. For example, calculating module 110 may, as part of computing device 202 and/or server 206 in FIG. 2, calculate internal activity 125 of machine learning model 123 during the classifying of input sample 121.

Referring to FIG. 4, the systems described herein may calculate internal activity (A) of neural network activations producing "Output Y." We now return to FIG. 3.

In one example, internal activity (A) of neural network activations may be calculated as:

$$A = \sum_k |a_k|^2$$

where:
A=internal activity
k=a number of nodes in the neural network
$a_k$=activation at k-th node As illustrated in FIG. 3, at step 310 one or more of the systems described herein may calculate activation entropies of the machine learning models occurring during the classifying of the input samples. The systems described herein may perform step 310 in a variety of ways. For example, calculating module 110 may, as part of computing device 202 and/or server 206 in FIG. 2, calculate activation entropy 126 of machine learning model 123 during the classifying of input sample 121.

Referring to FIG. 4, the systems described herein may calculate an activation entropy (H) of the neural network activations producing "Output Y." We now return to FIG. 3.

In some embodiments, activation entropy (H) of the neural network activations may be calculated as:

$$H = -\sum_k p(a_k)\log(p(a_k))$$

where:
H=activation entropy.
p=categorical histogram normalized that adds to one. Categories of the histogram are the nodes across a layer. Heights of the histogram are the respective activation values $a_k$ at a given inference time (i.e., for a given input sample). In some examples, p=probability mass function (pmf) with sample space taken to be a set of activation values $\{a_k\}$ across all nodes of a layer at a given inference time (i.e., for a given input sample).
k=a number of nodes in the neural network
$a_k$=activation at k-th node In some examples, it may be desirable to have a relatively lower activation entropy (H) when one node is active and the remainder of the nodes are largely inactive, versus a relatively higher activation entropy (H) when all nodes are simultaneously active. In some examples, it may be desirable to have a relatively lower activation entropy (H) when a few nodes are active and the remainder of the nodes are largely inactive, and a relatively higher activation entropy (H) when at least most nodes are simultaneously active.

As illustrated in FIG. 3, at step 312 one or more of the systems described herein may compare, to first thresholds, combinations of the internal activities and the activation entropies. The systems described herein may perform step 312 in a variety of ways. For example, comparing module 112 may, as part of computing device 202 and/or server 206 in FIG. 2, compare combination 128 of internal activity 125 and activation entropy 126 to first threshold 127. In some examples, the combinations may be referred to as "surprise levels" indicating degrees to which non-sparse activations occur during processing of the input samples to produce results identifying the input samples as benign or malicious.

Referring to FIG. 4, the systems described herein may combine the internal activity (A) of neural network activations producing "Output Y" with the activation entropy (H) of the neural network activations producing "Output Y." The combining may include multiplying the internal activity (A) of neural network activations producing "Output Y" with the activation entropy (H) of the neural network activations producing "Output Y" to produce a combined result for comparison to the first threshold (T).

In some embodiments, the combining may include performing a function on the internal activity (A) of neural network activations producing "Output Y" with the activation entropy (H) of the neural network activations producing "Output Y" to produce a combined result for comparison to the first threshold (T).

In some embodiments, the systems described herein may multiply a respective weight by either or both of the internal activity (A) of neural network activations producing "Output Y" and the activation entropy (H) of the neural network activations producing "Output Y" prior to, or as a part of, the combining.

In some embodiments, the combining may include adding the internal activity (A) of neural network activations producing "Output Y" with the activation entropy (H) of the neural network activations producing "Output Y" to produce a combined result for comparison to the first threshold (T).

In some embodiments, the combining may be optional. The internal activity (A) of neural network activations producing "Output Y" or the activation entropy (H) of the neural network activations producing "Output Y" may individually be compared to the first threshold (T).

In some embodiments, the systems described herein may compare, to first thresholds (T), the combinations of the internal activities and the activation entropies (e.g., to identify a significance of the combination).

We now return to FIG. 3.

As illustrated in FIG. 3, at step 314 one or more of the systems described herein may, when the combinations of the internal activities and the activation entropies at least meet the first thresholds, identify the result as low-confidence results. The systems described herein may perform step 314 in a variety of ways. For example, identifying module 114 may, as part of computing device 202 and/or server 206 in FIG. 2, when combination 128 meets or exceeds first threshold 127, identify result 124 as low-confidence result 129.

Referring to FIG. 4, the systems described herein may identify, when the combination of the internal activity (A) of neural network activations producing "Output Y" and the activation entropy (H) of the neural network activations producing "Output Y" at least meet the first threshold (T), "Output Y" as a low-confidence result.

In some examples, the systems described herein may identify, when the combination of the internal activity (A) of neural network activations producing "Output Y" and the activation entropy (H) of the neural network activations producing "Output Y" do not meet the first threshold (T), "Output Y" as a normal prediction and/or a high-confidence prediction.

In some examples, the systems described herein may compare the combinations to more than one threshold to accurately classify degrees of confidence in "Output Y." In some examples, the systems described herein may compare the combinations to multiple different thresholds to accurately classify degrees of confidence in "Output Y."

In an example, the results of the comparing may be stored in an event queue. In an example, the systems described herein may monitor, via a monitoring process, the event queue to identify needs to communicate data (e.g., comparison results and/or event queue contents) with a back-end computing device (e.g., server 206). For example, monitoring may include identifying a rate at which low-confidence results occur and comparing that rate to a third threshold. When the third threshold is at least met, then the computing device may send a notification (e.g., a "low confidence prediction," "possible data drift detected," and/or "model update request") to a back-end computing device. In some examples, monitoring may include identifying a quantity of low-confidence results and comparing that quantity to a fourth threshold. When the fourth threshold is at least met, then the computing device may send a notification (e.g., a "low confidence prediction," "possible data drift detected," and/or "model update request") to the back-end computing device. In some examples, monitoring may include sending a notice indicating low-confidence results (e.g., a "low confidence prediction") to the back-end computing device.

We now return to FIG. 3.

In an example, the method may further include sending, from the computing device and responsive to identifying the result as a low-confidence result, a notification to a back-end server (e.g., server 206) requesting a machine learning model update (e.g., as depicted in FIG. 4). In an embodiment, the machine learning model update may reduce overfitting. In an embodiment, the machine learning model update may be prepared by a sparse autoencoder learning algorithm operating on input samples of digital information having unknown reputations.

In an example, the method may further include (i) storing the low-confidence result in an event queue and (ii) sending, when a number of low-confidence results in the event queue meets or exceeds a second threshold and to a back-end server, a notification indicating data drift. In an embodiment, the method may further include receiving, responsive to the notification and from the back-end server, an instruction to set a monitoring mode. In an example, the method may further include receiving, responsive to the notification and from the back-end server, a machine learning model update.

In an embodiment, the method may further include sending, to a back-end server, a notification identifying the result as the low-confidence result. In an example, the method may further include receiving, responsive to the notification identifying the result as the low-confidence result and from the back-end server, a result override. In some embodiments, the method may further include receiving, responsive to the notification identifying the result as the low-confidence result and from the back-end server, an acknowledgement that the result is a low-confidence result.

In some examples, the method may further include (i) sending, responsive to identifying the result as the low-confidence result, the input sample to a back-end server and (ii) receiving a machine learning model update customized for the computing device, where the machine learning model update may be based at least in part on the input sample.

In some embodiments, the method may further include displaying, on a user display (e.g., display 160), an indication the result is a low-confidence result.

FIG. 7 is a diagram of example management 700 of multiple computing devices (702A, 702B, 702C, 702D, 702E) by a back-end computing device 704. Using back-end computing device 704 to manage multiple computing devices may mitigate variations across computing devices. FIG. 7 depicts a non-limiting example having back-end computing device 704 communicatively coupled to five computing devices (702A, 702B, 702C, 702D, 702E). Each of the five computing devices (702A, 702B, 702C, 702D, 702E) may send notifications to back-end computing device 704. In the example of FIG. 7, notifications sent to back-end computing device 704 from the computing devices (702A, 702B, 702C, 702D, 702E) may include "low confidence prediction," "possible data drift detected," and "model update request."

In response to the "low confidence prediction" notification, back-end computing device 704 may send a "prediction override" instruction and/or an "acknowledgement."

In response to the "possible data drift detected" notification, back-end computing device 704 may send a "set monitoring mode" instruction and/or a neural network model update to retrain the neural network of the respective.

In response to the "model update request" notification, back-end computing device 704 may send a neural network model update to retrain the neural network of the respective.

We now return to FIG. 3.

As detailed herein, the steps outlined in method 300 in FIG. 3 may advantageously improve the security of computing devices and/or provide targeted protection against malware and/or malicious users. As such, the provided techniques may protect users by beneficially reducing security risks posed by malicious processes and/or malicious users. In some embodiments, the provided techniques may advantageously improve accuracy of classifiers. In examples, the provided techniques may advantageously mitigate data drift with time and/or variation across computing devices.

Figure 8:
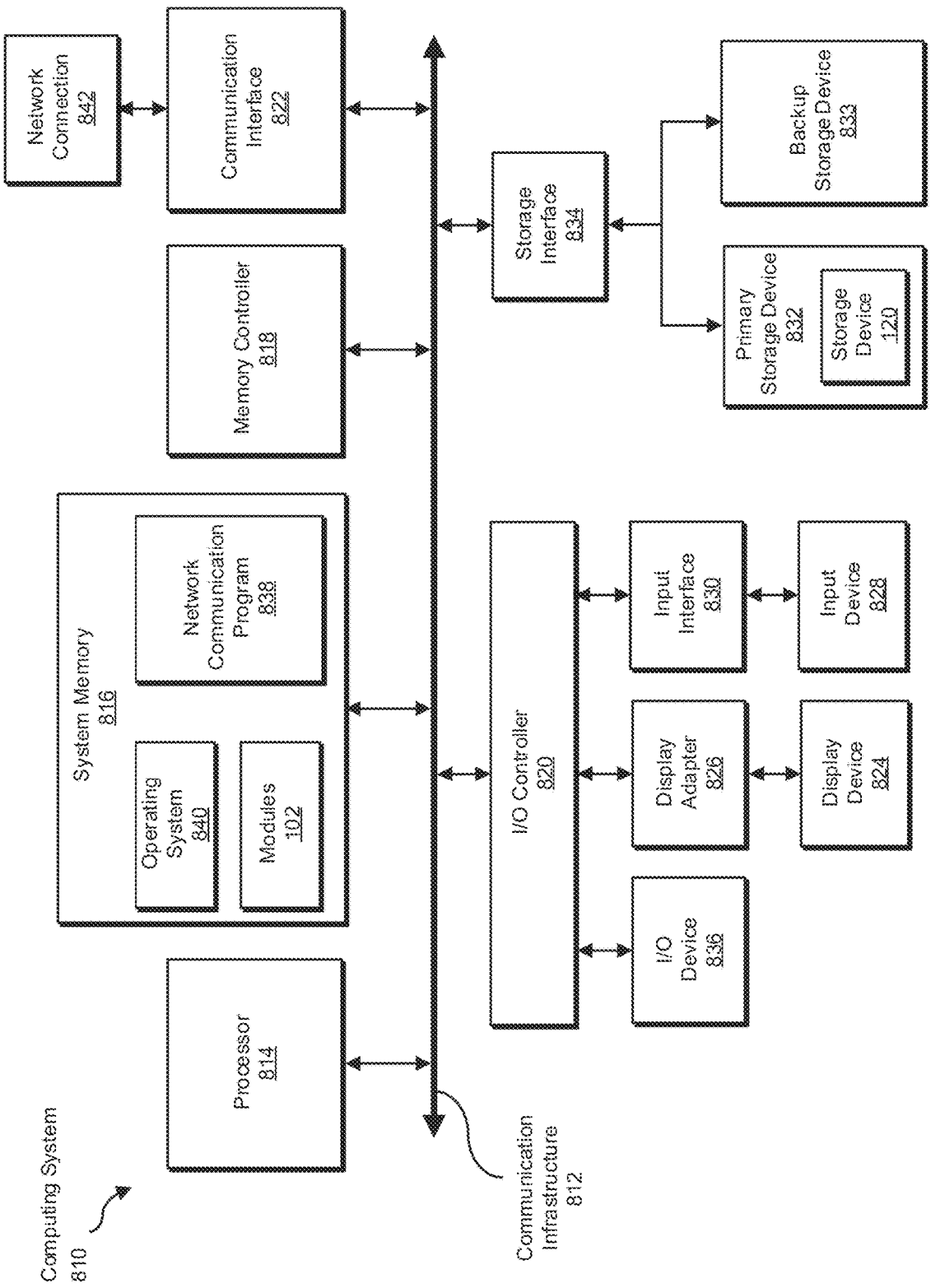
FIG. 8 is a block diagram of an example computing system capable of implementing one or more of the embodiments described and/or illustrated herein.

FIG. 8 is a block diagram of an example computing system 810 capable of implementing one or more of the embodiments described and/or illustrated herein. For example, all or a portion of computing system 810 may perform and/or be a means for performing, either alone or in combination with other elements, one or more of the steps described herein (such as one or more of the steps illustrated in FIG. 3). All or a portion of computing system 810 may also perform and/or be a means for performing any other steps, methods, or processes described and/or illustrated herein.

Computing system 810 broadly represents any single or multi-processor computing device or system capable of executing computer-readable instructions. Examples of computing system 810 include, without limitation, workstations, laptops, client-side terminals, servers, distributed computing systems, handheld devices, or any other computing system or device. In its most basic configuration, computing system 810 may include at least one processor 814 and a system memory 816.

Processor 814 generally represents any type or form of physical processing unit (e.g., a hardware-implemented central processing unit) capable of processing data or interpreting and executing instructions. In certain embodiments, processor 814 may receive instructions from a software application or module. These instructions may cause processor 814 to perform the functions of one or more of the example embodiments described and/or illustrated herein.

System memory 816 generally represents any type or form of volatile or non-volatile storage device or medium capable of storing data and/or other computer-readable instructions. Examples of system memory 816 include, without limitation, Random Access Memory (RAM), Read Only Memory (ROM), flash memory, or any other suitable memory device. Although not required, in certain embodiments computing system 810 may include both a volatile memory unit (such as, for example, system memory 816) and a non-volatile storage device (such as, for example, primary storage device 832, as described in detail below). In one example, one or more of modules 102 from FIG. 1 may be loaded into system memory 816.

In some examples, system memory 816 may store and/or load an operating system 840 for execution by processor 814. In one example, operating system 840 may include and/or represent software that manages computer hardware and software resources and/or provides common services to computer programs and/or applications on computing system 810. Examples of operating system 840 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 810 may also include one or more components or elements in addition to processor 814 and system memory 816. For example, as illustrated in FIG. 8, computing system 810 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI Express (PCIe), or similar bus) and a network.

Memory controller 818 generally represents any type or form of device capable of handling memory or data or controlling communication between one or more components of computing system 810. For example, in certain embodiments memory controller 818 may control communication between processor 814, system memory 816, and I/O controller 820 via communication infrastructure 812.

I/O controller 820 generally represents any type or form of module capable of coordinating and/or controlling the input and output functions of a computing device. For example, in certain embodiments I/O controller 820 may control or facilitate transfer of data between one or more elements of computing system 810, such as processor 814, system memory 816, communication interface 822, display adapter 826, input interface 830, and storage interface 834.

As illustrated in FIG. 8, computing system 810 may also include at least one display device 824 coupled to I/O controller 820 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer, as known in the art) for display on display device 824.

As illustrated in FIG. 8, example computing system 810 may also include at least one input device 828 coupled to I/O controller 820 via an input interface 830. Input device 828 generally represents any type or form of input device capable of providing input, either computer or human generated, to example computing system 810. Examples of input device 828 include, without limitation, a keyboard, a pointing device, a speech recognition device, variations or combinations of one or more of the same, and/or any other input device.

Additionally or alternatively, example computing system 810 may include additional I/O devices. For example, example computing system 810 may include I/O device 836. In this example, I/O device 836 may include and/or represent a user interface that facilitates human interaction with computing system 810. Examples of I/O device 836 include, without limitation, a computer mouse, a keyboard, a monitor, a printer, a modem, a camera, a scanner, a microphone, a touchscreen device, variations or combinations of one or more of the same, and/or any other I/O device.

Communication interface 822 broadly represents any type or form of communication device or adapter capable of facilitating communication between example computing system 810 and one or more additional devices. For example, in certain embodiments communication interface 822 may facilitate communication between computing system 810 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet.

Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 810 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 822 may also allow computing system 810 to engage in distributed or remote computing. For example, communication interface 822 may receive instructions from a remote device or send instructions to a remote device for execution.

In some examples, system memory 816 may store and/or load a network communication program 838 for execution by processor 814. In one example, network communication program 838 may include and/or represent software that enables computing system 810 to establish a network connection 842 with another computing system (not illustrated in FIG. 8) and/or communicate with the other computing system by way of communication interface 822. In this example, network communication program 838 may direct the flow of outgoing traffic that is sent to the other computing system via network connection 842. Additionally or alternatively, network communication program 838 may direct the processing of incoming traffic that is received from the other computing system via network connection 842 in connection with processor 814.

Although not illustrated in this way in FIG. 8, network communication program 838 may alternatively be stored and/or loaded in communication interface 822. For example, network communication program 838 may include and/or represent at least a portion of software and/or firmware that is executed by a processor and/or Application Specific Integrated Circuit (ASIC) incorporated in communication interface 822.

As illustrated in FIG. 8, example computing system 810 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a solid state drive, a floppy disk drive, a magnetic tape drive, an optical disk drive, a flash drive, or the like. Storage interface 834 generally represents any type or form of interface or device for transferring data between storage devices 832 and 833 and other components of computing system 810. In one example, input sample 121, security action 122, machine learning model 123, result 124, internal activity 125, activation entropy 126, first threshold 127, combination 128, and/or low-confidence result 129 from FIG. 1 may be stored and/or loaded in primary storage device 832.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 810. For example, storage devices 832 and 833 may be configured to read and write software, data, or other computer-readable information. Storage devices 832 and 833 may also be a part of computing system 810 or may be a separate device accessed through other interface systems.

Many other devices or subsystems may be connected to computing system 810. Conversely, all of the components and devices illustrated in FIG. 8 need not be present to practice the embodiments described and/or illustrated herein. The devices and subsystems referenced above may also be interconnected in different ways from that shown in FIG. 8. Computing system 810 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 810. All or a portion of the computer program stored on the computer-readable medium may then be stored in system memory 816 and/or various portions of storage devices 832 and 833. When executed by processor 814, a computer program loaded into computing system 810 may cause processor 814 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 810 may be configured as an Application Specific Integrated Circuit (ASIC) adapted to implement one or more of the example embodiments disclosed herein.

Figure 9:
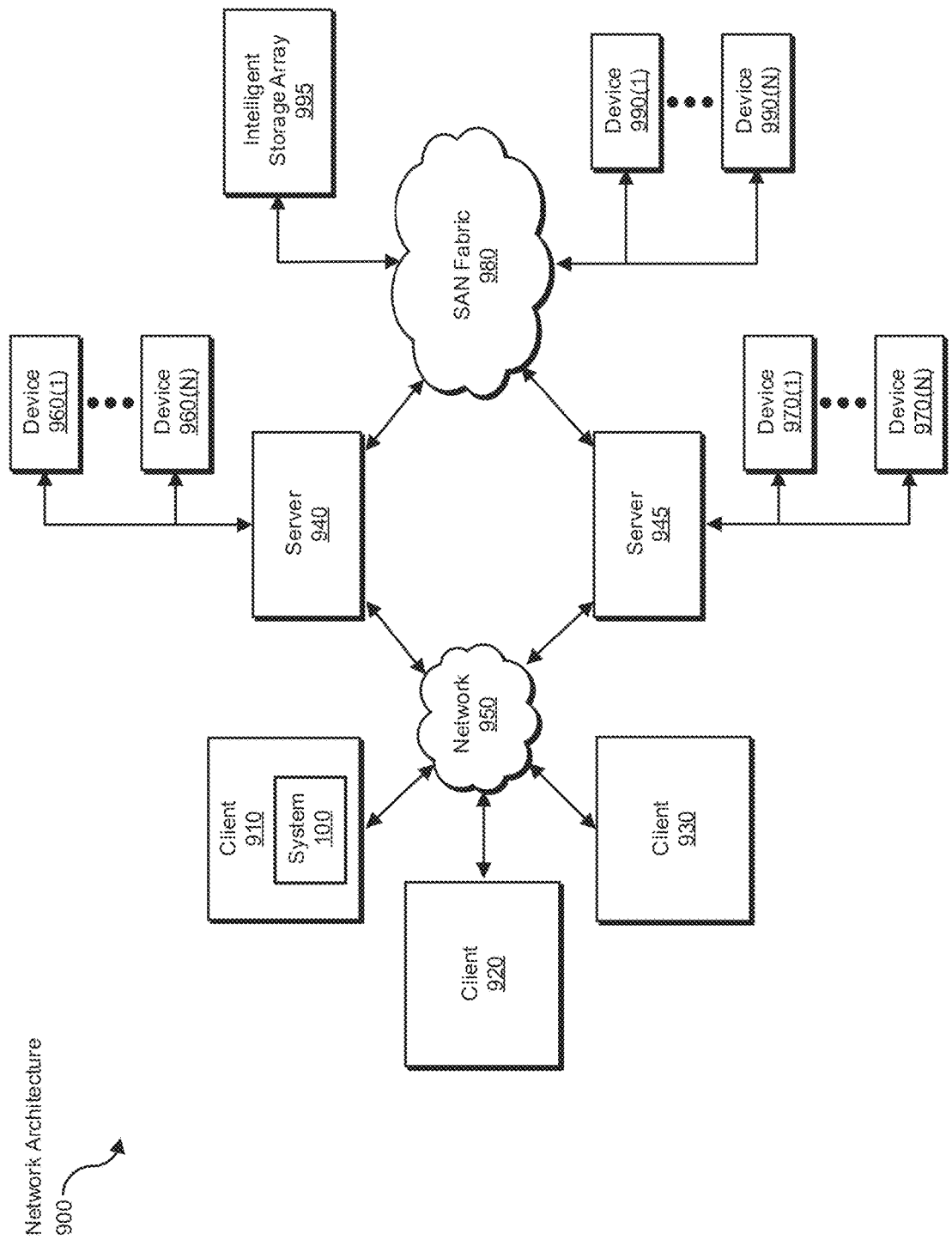
FIG. 9 is a block diagram of an example computing network capable of implementing one or more of the embodiments described and/or illustrated herein.

FIG. 9 is a block diagram of an example network architecture 900 in which client systems 910, 920, and 930 and servers 940 and 945 may be coupled to a network 950. As detailed above, all or a portion of network architecture 900 may perform and/or be a means for performing, either alone or in combination with other elements, one or more of the steps disclosed herein (such as one or more of the steps illustrated in FIG. 3). All or a portion of network architecture 900 may also be used to perform and/or be a means for performing other steps and features set forth in the present disclosure.

Client systems 910, 920, and 930 generally represent any type or form of computing device or system, such as example computing system 810 in FIG. 8. Similarly, servers 940 and 945 generally represent computing devices or systems, such as application servers or database servers, configured to provide various database services and/or run certain software applications. Network 950 generally represents any telecommunication or computer network including, for example, an intranet, a WAN, a LAN, a PAN, or the Internet. In one example, client systems 910, 920, and/or 930 and/or servers 940 and/or 945 may include all or a portion of system 100 from FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent Network-Attached Storage (NAS) devices configured to communicate with servers 940 and 945 using various protocols, such as Network File System (NFS), Server Message Block (SMB), or Common Internet File System (CIFS).

Servers 940 and 945 may also be connected to a Storage Area Network (SAN) fabric 980. SAN fabric 980 generally represents any type or form of computer network or architecture capable of facilitating communication between a plurality of storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to example computing system 810 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 940, server 945, storage devices 960(1)-(N), storage devices 970(1)-(N), storage devices 990(1)-(N), intelligent storage array 995, or any combination thereof. All or a portion of one or more of the example embodiments disclosed herein may also be encoded as a computer program, stored in server 940, run by server 945, and distributed to client systems 910, 920, and 930 over network 950.

As detailed above, computing system 810 and/or one or more components of network architecture 900 may perform and/or be a means for performing, either alone or in combination with other elements, one or more steps of an example method for adaptively managing data drift in a classifier.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive data (e.g., an input sample of digital information having an unknown reputation) to be transformed, transform the data, output a result of the transformation to a back-end server, use the result of the transformation to perform a security action, and store the result of the transformation to a storage device. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure. In some examples, the singular portends the plural, where practicable.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for adaptively managing data drift in a classifier, at least a portion of the method being performed by a computing device comprising at least one processor, the method comprising:
   receiving, at the computing device, an input sample of digital information having an unknown reputation; and
   performing, at the computing device, a security action comprising:
   identifying the input sample as either benign or malicious based on a result obtained by classifying the input sample using a machine learning model trained using activity regularization;
   calculating, based at least in part on a pattern of activations of nodes of the machine learning model occurring during the classifying of the input sample, an internal activity of the machine learning model occurring during the classifying of the input sample, wherein a number of activations of nodes of the machine learning model during the classifying of the input sample corresponds to an internal activity; calculating, based at least in part on a pattern of activations of nodes of the machine learning model occurring during the classifying of the input sample, an activation entropy of the machine learning model occurring during the classifying of the input sample, wherein the number of simultaneous activations of nodes of the machine learning model corresponds to an activation entropy;
   comparing a combination of the internal activity and the activation entropy to a first threshold; and
   in response to determining that the combination of the internal activity and the activation entropy meets or exceeds the first threshold, identifying the result as a low-confidence result.

2. The computer-implemented method of claim 1, further comprising sending, from the computing device and responsive to identifying the result as a low-confidence result, a notification to a back-end server requesting a machine learning model update.

3. The computer-implemented method of claim 2, wherein the machine learning model update reduces overfitting.

4. The computer-implemented method of claim 1, further comprising: storing the low-confidence result in an event queue; and sending, in response to determining that a number of low-confidence results in the event queue meets or exceeds a second threshold and to a back-end server, a notification indicating data drift.

5. The computer-implemented method of claim 4, further comprising receiving, responsive to the notification and from the back-end server, an instruction to set a monitoring mode.

6. The computer-implemented method of claim 4, further comprising receiving, responsive to the notification and from the back-end server, a machine learning model update.

7. The computer-implemented method of claim 1, further comprising sending, to a back-end server, a notification identifying the result as the low-confidence result.

8. The computer-implemented method of claim 7, further comprising receiving, responsive to the notification identifying the result as the low-confidence result and from a back-end server, a result override.

9. The computer-implemented method of claim 7, further comprising receiving, responsive to the notification identifying the result as the low-confidence result and from a back-end server, an acknowledgement that the result is a low-confidence result.

10. The computer-implemented method of claim 1, further comprising:
   sending, responsive to identifying the result as the low-confidence result, the input sample to a back-end server; and
   receiving a machine learning model update customized for the computing device, wherein the machine learning model update is based at least in part on the input sample.

11. The computer-implemented method of claim 1, wherein the machine learning model comprises a random forest classifier.

12. The computer-implemented method of claim 1, wherein the machine learning model comprises a neural forest classifier.

13. The computer-implemented method of claim 1, wherein the machine learning model comprises a neural network configured as a classifier.

14. The computer-implemented method of claim 1, further comprising displaying, on a user display, an indication the result is a low-confidence result.

15. A system for adaptively managing data drift in a classifier, the system comprising: a computing device comprising at least one physical processor; and physical memory comprising computer-executable instructions that, when executed by the physical processor, cause the physical processor to: receive, at the computing device, an input sample of digital information having an unknown reputation; and perform, at the computing device, a security action comprising: identifying the input sample as either benign or malicious based on a result obtained by classifying the input sample using a machine learning model trained using activity regularization; calculating, based at least in part on a pattern of activations of nodes of the machine learning model occurring during the classifying of the input sample, an internal activity of the machine learning model occurring during the classifying of the input sample, wherein a number of activations of nodes of the machine learning model during the classifying of the input sample corresponds to an internal activity; calculating, based at least in part on a pattern of activations of nodes of the machine learning model occurring during the classifying of the input sample, an activation entropy of the machine learning model occurring during the classifying of the input sample, wherein the number of simultaneous activations of nodes of the machine learning model corresponds to an activation entropy; comparing a combination of the internal activity and the activation entropy to a first threshold; and in response to determining that the combination of the internal activity and the activation entropy meets or exceeds the first threshold, identifying the result as a low-confidence result.

16. The system of claim 15, wherein the security action further comprises sending, from the computing device and responsive to identifying the result as a low-confidence result, a notification to a back-end server requesting a machine learning model update.

17. A non-transitory computer-readable medium comprising one or more computer-executable instructions that is configured for execution by at least one processor of a computing device, cause the computing device to: receive, at the computing device, an input sample of digital information having an unknown reputation; and perform, at the computing device, a security action comprising: identifying the input sample as either benign or malicious based on a result obtained by classifying the input sample using a machine learning model trained using activity regularization; calculating, based at least in part on a pattern of activations of nodes of the machine learning model occurring during the classifying of the input sample an internal activity of the machine learning model occurring during the classifying of the input sample, wherein a number of activations of nodes of the machine learning model during the classifying of the input sample corresponds to an internal activity; calculating, based at least in part on a pattern of activations of nodes of the machine learning model occurring during the classifying of the input sample an activation entropy of the machine learning model occurring during the classifying of the input sample, wherein the number of simultaneous activations of nodes of the machine learning model corresponds to an activation entropy; comparing a combination of the internal activity and the activation entropy to a first threshold; and in response to determining that the combination of the internal activity and the activation entropy meets or exceeds the first threshold, identifying the result as a low-confidence result.

18. The non-transitory computer-readable medium of claim 17, wherein the security action further comprises sending, from the computing device and responsive to identifying the result as a low-confidence result, a notification to a back-end server requesting a machine learning model update.

* * * * *